US012182236B2

(12) United States Patent
Goodman et al.

(10) Patent No.: US 12,182,236 B2
(45) Date of Patent: Dec. 31, 2024

(54) AUTOMATIC PROVISIONING AND ONBOARDING OF OFFLINE OR DISCONNECTED MACHINES

(71) Applicant: Dell Products L.P., Round Rock, TX (US)

(72) Inventors: Bradley K. Goodman, Nashua, NH (US); Kirk Alan Hutchinson, Londonderry, NH (US); Joseph Caisse, Burlington, MA (US)

(73) Assignee: Dell Products L.P., Round Rock, TX (US)

( * ) Notice: Subject to any disclaimer, the term of this patent is extended or adjusted under 35 U.S.C. 154(b) by 335 days.

(21) Appl. No.: 18/046,593

(22) Filed: Oct. 14, 2022

(65) Prior Publication Data
US 2024/0126845 A1    Apr. 18, 2024

(51) Int. Cl.
*G06F 21/57*    (2013.01)
*G06F 21/31*    (2013.01)
*G06F 21/60*    (2013.01)

(52) U.S. Cl.
CPC ............ *G06F 21/31* (2013.01); *G06F 21/602* (2013.01); *G06F 2221/2141* (2013.01)

(58) Field of Classification Search
CPC .................. G06F 21/31; G06F 21/602; G06F 2221/2141; G06F 21/53; G06F 21/57
See application file for complete search history.

(56) References Cited

U.S. PATENT DOCUMENTS

| | | | |
|---|---|---|---|
| 11,552,803 | B1 | 1/2023 | Simkhada |
| 2004/0193917 | A1 | 9/2004 | Drews |
| 2006/0236111 | A1 | 10/2006 | Bodensjo |
| 2014/0298040 | A1 | 10/2014 | Ignatchenko |
| 2015/0023183 | A1* | 1/2015 | Ilsar ............ H04W 48/08 370/254 |
| 2017/0093815 | A1* | 3/2017 | Chen ............ H04L 67/141 |
| 2019/0200405 | A1* | 6/2019 | Gupta ............ H04W 4/70 |
| 2019/0384916 | A1 | 12/2019 | Shah |
| 2020/0213191 | A1* | 7/2020 | Watsen ........ H04L 61/5014 |
| 2020/0327231 | A1* | 10/2020 | Smith ............ G06F 21/33 |
| 2021/0409231 | A1 | 12/2021 | Fedorkow |

(Continued)

OTHER PUBLICATIONS

"Secure Device On board", 2020, obtained online from <https://secure-device-onboard.github.io/docs/1.9.0/>, retrieved on Oct. 11, 2024 (Year: 2020), 7 pages.

(Continued)

*Primary Examiner* — Ali S Abyaneh
(74) *Attorney, Agent, or Firm* — Womble Bond Dickinson (US) LLP

(57) ABSTRACT

Systems, devices, and method for managing data processing systems are disclosed. The data processing systems may be capable of operating in various manners. To manage the data processing systems, onboarding processes may be performed to conform the operation of the data processing systems to meet the expectations of owners of the data processing systems. To facilitate onboarding, onboarding payloads may be generated in a domain in which data necessary for onboarding is available. The onboarding payloads may be transferred to data processing systems in domains in which the necessary data is not available to onboard the data processing systems.

20 Claims, 7 Drawing Sheets

(56) References Cited

U.S. PATENT DOCUMENTS

| | | |
|---|---|---|
| 2022/0303123 A1 | 9/2022 | Cabre |
| 2023/0034615 A1 | 2/2023 | Detienne |
| 2023/0367489 A1 | 11/2023 | Dover |
| 2023/0370454 A1 | 11/2023 | Mohammed |
| 2023/0394493 A1 | 12/2023 | Rao |
| 2024/0007354 A1* | 1/2024 | Zoualfaghari ...... H04L 41/0895 |
| 2024/0039723 A1 | 2/2024 | Ito |
| 2024/0064028 A1 | 2/2024 | Fedorkow |
| 2024/0243967 A1* | 7/2024 | Singh ................. H04L 41/0806 |

OTHER PUBLICATIONS

G. Cooper et al., "FIDO Device On board Specification 1.1", Apr. 19, 2022, obtained on line from <https://fidoalliance.org/specs/FDO/FIDO-Device-Onboard-PS-v1.1-20220419/FIDO-Device-Onboard-PS-v1.1-20220419.html>, retrieved on Oct. 11, 2024 (Year: 2022), 98 pages.

K. Watsen et al., "A Voucher Artifact for Bootstrapping Protocols", May 2018, Internet Engineering Task Force (IETF) Request for Comments: 8366 (Year: 2018), pp. 1-23.

"Detailed Protocol Description—Secure Device Onboard", Apr. 28, 2021, obtained online from <https://secure-device-onboard.github.io/docs/1.8.0/protocol-specification/detailed-protocol-description/>, retrieved on Jul. 13, 2024 (Year: 2021), pp. 1-30.

\* cited by examiner

AUTOMATIC PROVISIONING AND ONBOARDING OF OFFLINE OR DISCONNECTED MACHINES

FIELD

Embodiments disclosed herein relate generally to managing data processing systems. More particularly, embodiments disclosed herein relate to systems and methods to manage onboarding of a data processing system.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
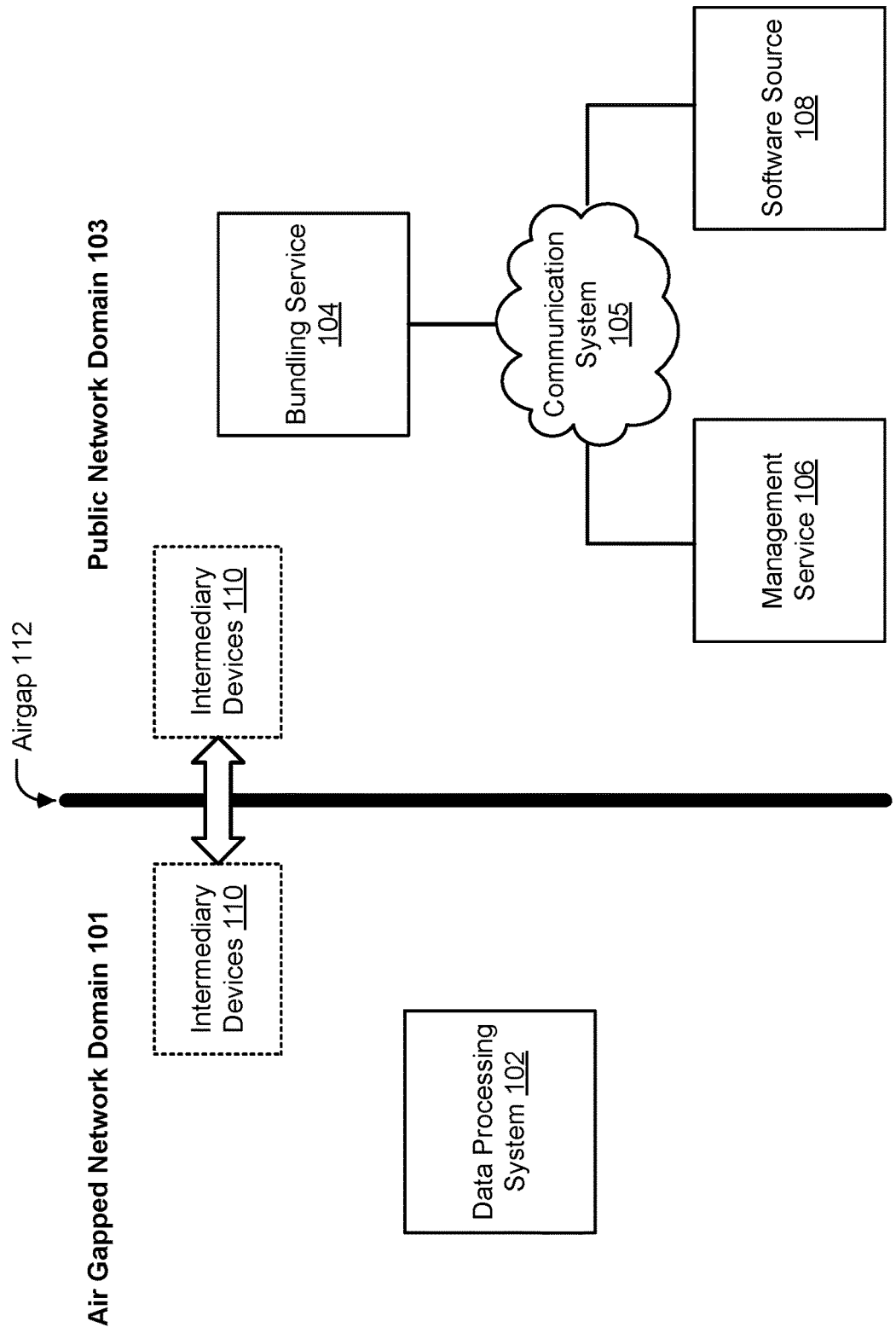
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and system for managing secure device onboarding (hereby referred to as "onboarding") of a data processing system. Onboarding a data processing system may place the data processing system in an operating state desired by a user, owner, or other person. Onboarding may permit the data processing system to be manufactured, warehoused, and sold, without any prior knowledge of which users, owners, and/or other persons will utilize the data processing system in the future.

To onboard a data processing system, various portions of data may be used by the data processing system. These portions of data may be located in various locations via a network. However, for data processing systems that will join isolated network domains, the data processing systems may be unable to independently collect the portions of data necessary to complete onboarding.

A system in accordance with embodiments may include an onboarding service usable to obtain an onboarding payload. The onboarding payload may include all of the portions of data necessary to complete an onboarding of a data processing system. The bundling services may be operably connected to the sources of the necessary data thereby allowing the bundling service to obtain necessary data for onboarding the data processing system.

Once obtained, the onboarding payload may be transferred to the data processing system via an intermediary device that is able to move between domains. For example, the onboarding payload may be stored on a portable storage device which may operably connect to and present itself as a mass storage device to the data processing system. When so connected, the data processing system may access and use the onboarding payload to complete onboarding of the data processing system.

In an embodiment, a computer-implemented method for managing onboarding of a data processing system within an isolated network domain (e.g., the air gapped network domain mentioned above) is provided. The method may include receiving, by a bundling service, a request from a requestor (e.g., the owner of the data processing system) to obtain an onboarding payload for the data processing system while the data processing system is unable to independently obtain the data and policies required for onboarding. Based on the request, the method may further include obtaining, by the bundling service, an ownership voucher that delegates authority over the data processing system to the requestor; obtaining, by the bundling service, access credentials for then air gapped network domain to which the data processing system will be deployed and a software loadout identifying software required for onboarding of the data processing system; obtaining, by the bundling service, an application image based on the software loadout; obtaining, by the bundling service, the onboarding payload using the ownership voucher, the access credentials, the software loadout, and the application image; and storing, by the bundling service, a copy of the onboarding payload onto an intermediary device.

The onboarding payload may be a cryptographically secure, self-sufficient single file including data required to onboard the data processing system to the first domain.

The bundling service may be operably connected to a second domain, and the bundling service may be unable to operably connected to devices operably connected to the first domain.

Delegating authority over the data processing system may include providing, by the ownership voucher, cryptographically secure information that identifies an owner of the data processing system; providing, by the ownership voucher, cryptographically secure component validation data for the data processing system; and providing, by the ownership voucher, a cryptographically secure set of configurations that modify existing configurations of the data processing system.

Obtaining the access credentials and software loadout may include obtaining, by the bundling service, a management agent that identifies the application image, wherein the application image comprises software applications required for onboarding the data processing system onto the first domain; and obtaining, by the bundling service, client credentials and server credentials for the data processing system to gain permissions within the first domain.

The intermediary device may be operably connected to the first domain and is not operably connected to the second domain.

The intermediary device may be operably connected to the second domain and may not be operably connected to the first domain.

Uploading the onboarding payload onto the intermediary device may include modifying, by the bundling service, a management agent to identify a copy of the application image stored in the onboarding payload rather than a location from which the application image was obtained prior to obtaining the onboarding payload.

The method may also include connecting the intermediary device to the data processing system to initiate onboarding of the data processing system to the first domain; identifying, by the data processing system, presence of the onboarding payload on the intermediary device; and completing, by the data processing system and based on the identification, the onboarding of the data processing system using the onboarding payload.

Portions of the onboarding payload may be signed using a cryptographic key of an entity that delegates the authority over the data processing system to the requestor to establish a root of trust for the data processing system that is independent of all control planes used to manage the data processing system.

In an embodiment, a non-transitory computer readable medium is provided that stores instructions that when executed by a processor causes the computer-implemented method to be performed.

In an embodiment, a data processing system is provided that includes a processor and a non-transitory computer readable medium that stored the instructions that when executed by the processor causes the computer-implemented method to be performed.

Turning to FIG. 1, a block diagram illustrating a system in accordance with an embodiment is shown. The system shown in FIG. 1 may provide computer implemented services within an air gapped network domain 101. To provide the computer implemented services, any number of data processing systems may be located in air gapped network domain 101.

Overtime, additional data processing systems may need to be added to air gapped network domain 101. For example, some existing data processing systems may fail and need to be replaced, the number of computer implemented services and/or capacity for the services may be expanded resulting in a need for additional data processing systems, and/or for other reasons.

To add data processing systems to air gapped network domain 101, data processing system 102 may be onboarded into air gapped network domain 101. Onboarding may include, for example, placing data processing system 102 in an operating state (i) as expected by an operator of air gapped network domain 101, (ii) that allows the operator of air gapped network domain 101 to manage data processing system 102, and/or (iii) that is otherwise desired by an owner of data processing system 102. By doing so, additional capabilities may be added to air gapped network domain.

To onboard data processing system 102 to air gapped network domain 101, policies, ownership information, and/or other types of data (e.g., in aggregate, the "onboarding data") from various sources within public network domain 103 may need to be obtained. The onboarding may conform the operation of data processing system 102 to that expected by the owner and/or operator of air gapped network domain 101.

Data processing system 102, when placed in air gapped network domain 101, may be unable to independently collect the onboarding data necessary for onboard to air gapped network domain 101. The lack of connection between data processing system 102 to public network domain 103 may prevent data processing system 102 from collecting the onboarding data.

In general, embodiments disclosed herein may provide systems, devices, and methods for onboarding data processing systems. The disclosed systems, devices, and method may facilitate onboarding of data processing systems (e.g., 102) on air-gapped network domains isolated from sources of onboarding data. To facilitate onboarding of data processing systems to air gapped network domains that make independent collection of onboarding data challenging (e.g., lack of connection to sources of onboarding data), embodiments disclosed herein may provide a framework for (i) assembling onboarding data for a data processing system outside of an air gapped network domain to obtain an onboarding payload, (ii) transferring the onboarding payload to the air-gapped network domain, and (iii) using the transferred onboarding payload to onboard the data processing system in the air gapped network domain.

By doing so, embodiments disclosed herein facilitate onboarding of data processing systems (e.g., data processing system 102) to air gapped network domains separated from sources of onboarding data. To provide this functionality, a system in accordance with an embodiment may include bundling service 104, management service 106, software source 108, and one or more intermediary devices 110. Each of these components are discussed below.

Intermediary devices may store information and traverse (drawn with dashed outline in FIG. 1 to indicate that any of the intermediary devices may be positioned in and/or operably connected to either air gapped network domain 101 or public network domain 103, or components positioned therein, at varying points in time) between air gapped network domain 101 and public network domain 103. For example, intermediary devices 110 may be implemented using universal serial bus (USB) mass storage devices. The onboarding payload and/or other data structures may be moved between air gapped network domain 101 and public network domain 103 via intermediary devices 110. To facilitate onboarding, an intermediary devices in which an onboarding payload is stored may be operably connected to data processing system 102 thereby allowing data processing system 102 to access all onboarding data necessary to onboard to air gapped network domain 101.

The bundling service 104 may (i) gather information necessary to onboard data processing system 102, (ii) generate an onboarding payload usable to onboard data processing system 102 to air gapped network domain 101, and (iii) provide the onboarding payload to an intermediary device. Once provided, the intermediary device may be used to transport the onboarding payload to data processing system 102 in air gapped network domain 101 (e.g., from outside of the air gapped network domain). Bundling service 104 may store the onboarding payload on the intermediary device as a cryptographically secure, single, and self-sufficient file. Prior to use, data processing system 102 may validate the onboarding payload and/or the intermediary device prior to using the onboarding payload.

Management service 106 may provide information from a manufacture (e.g., an ownership voucher for data processing system 102, discussed below) of data processing system 102 usable to onboard data processing system 102. The ownership voucher may be integrated into the onboarding payload.

Software source 108 may provide copies of images of applications and/or other types of software (and/or other types of data structures usable to instantiate executing entities on data processing system 102) to be hosted on data processing system 102 once onboarded.

Bundling service 104 may receive a request from a requestor (e.g., the individual attempting to onboard data processing system 102, such as a new owner or representative) to obtain the onboarding payload for data processing system 102 while data processing system 102 is unable to independently obtain the onboarding payload. Based on the request, bundling service 104 may (i) obtain the ownership voucher (mentioned above, and discussed further with respect to FIGS. 2B-2C), (ii) obtain access credentials (discussed further with respect to FIGS. 2A and 2C) for a domain to which data processing system 102 will join, (iii) obtain a software loadout for data processing system 102, (iv) obtain one or more application images based on the software loadout, (v) obtain the onboarding payload using the ownership voucher, the access credentials, the software loadout, and the application image, and/or (vi) store a copy of the onboarding payload in an intermediary device (which may transport the onboarding payload to data processing system in the air gapped network domain 101).

By doing so, embodiments disclosed herein may facilitate onboarding of data processing systems to domain in which they are unable to independently gather the information necessary to complete onboarding.

Figure 3:
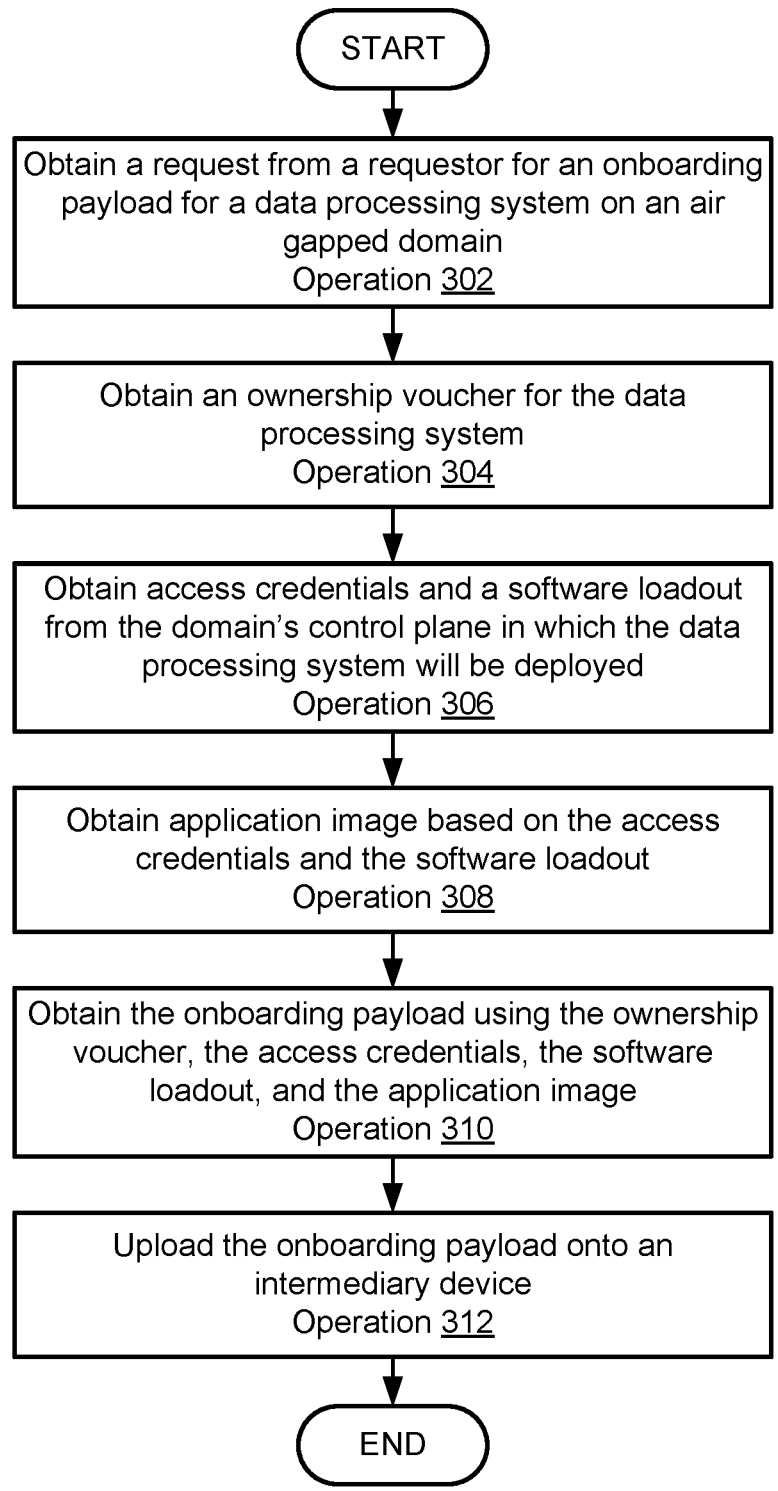
FIGS. 3-4 show flow diagrams illustrating methods for managing a data processing system in accordance with an embodiment.
Figure 4:
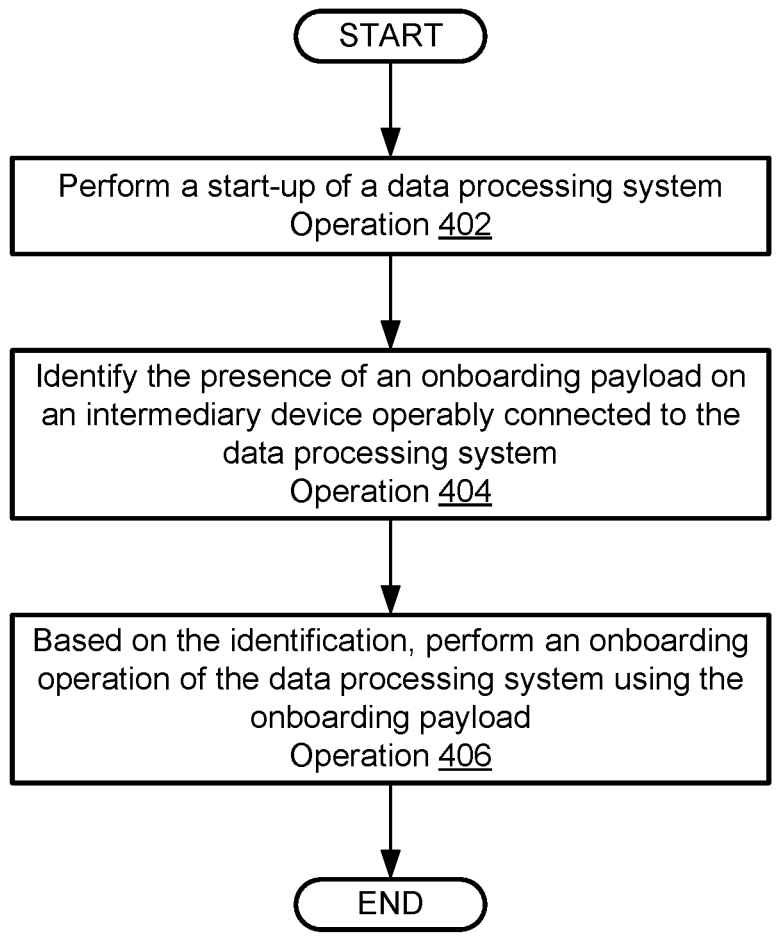

When providing its functionality, bundling service 104 and/or data processing system 102 may perform all, or a portion, of the methods, operations, and/or actions shown in FIGS. 3-4.

Figure 5:
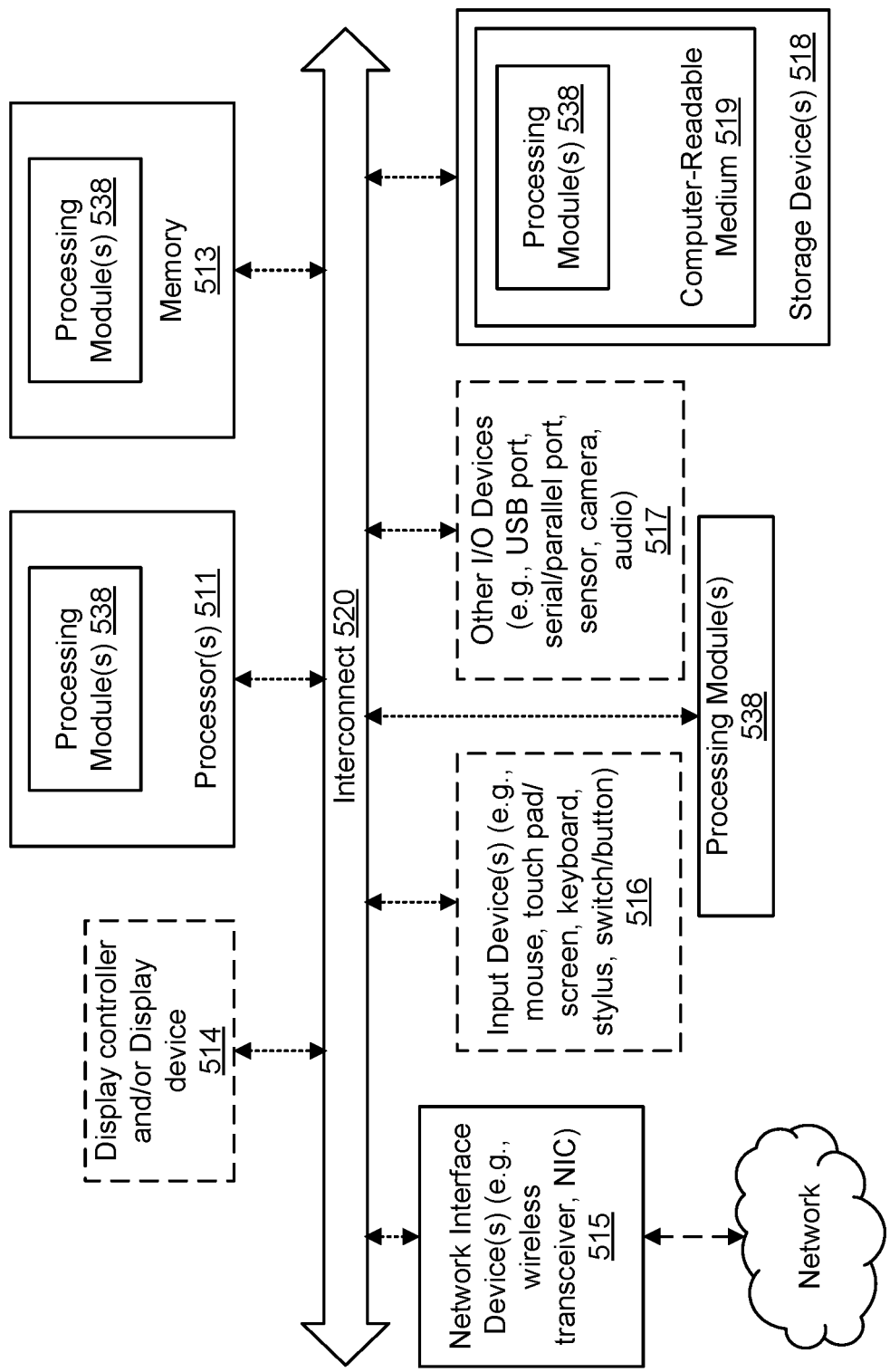
FIG. 5 shows a block diagram illustrating a data processing system in accordance with an embodiment.

Data processing system 102, bundling service 104, management service 106, and/or software source 108 may be implemented using a computing device such as a host or server, a personal computer (e.g., desktops, laptops, and tablets), a "thin" client, a personal digital assistant (PDA), a Web enabled appliance, or a mobile phone (e.g., Smartphone), an embedded system, local controllers, and/or any other type of data processing device or system. Refer to FIG. 5 for additional information regarding computing devices.

Any of the components within the public network domain 103, illustrated in FIG. 1, may be operably connected to each other (and/or components not illustrated) with communication system 105. In an embodiment, communication system 105 includes one or more networks that facilitate communication between any number of components. The networks may include wired networks and/or wireless networks (e.g., and/or the Internet). The networks may operate in accordance with any number and types of communication protocols (e.g., such as the internet protocol). Communication system 105 may not facilitate communications with devices within air gapped network domain 101.

While illustrated in FIG. 1 as included a limited number of specific components, a system in accordance with an embodiment may include fewer, additional, and/or different components than those illustrated therein.

Figure 2A:
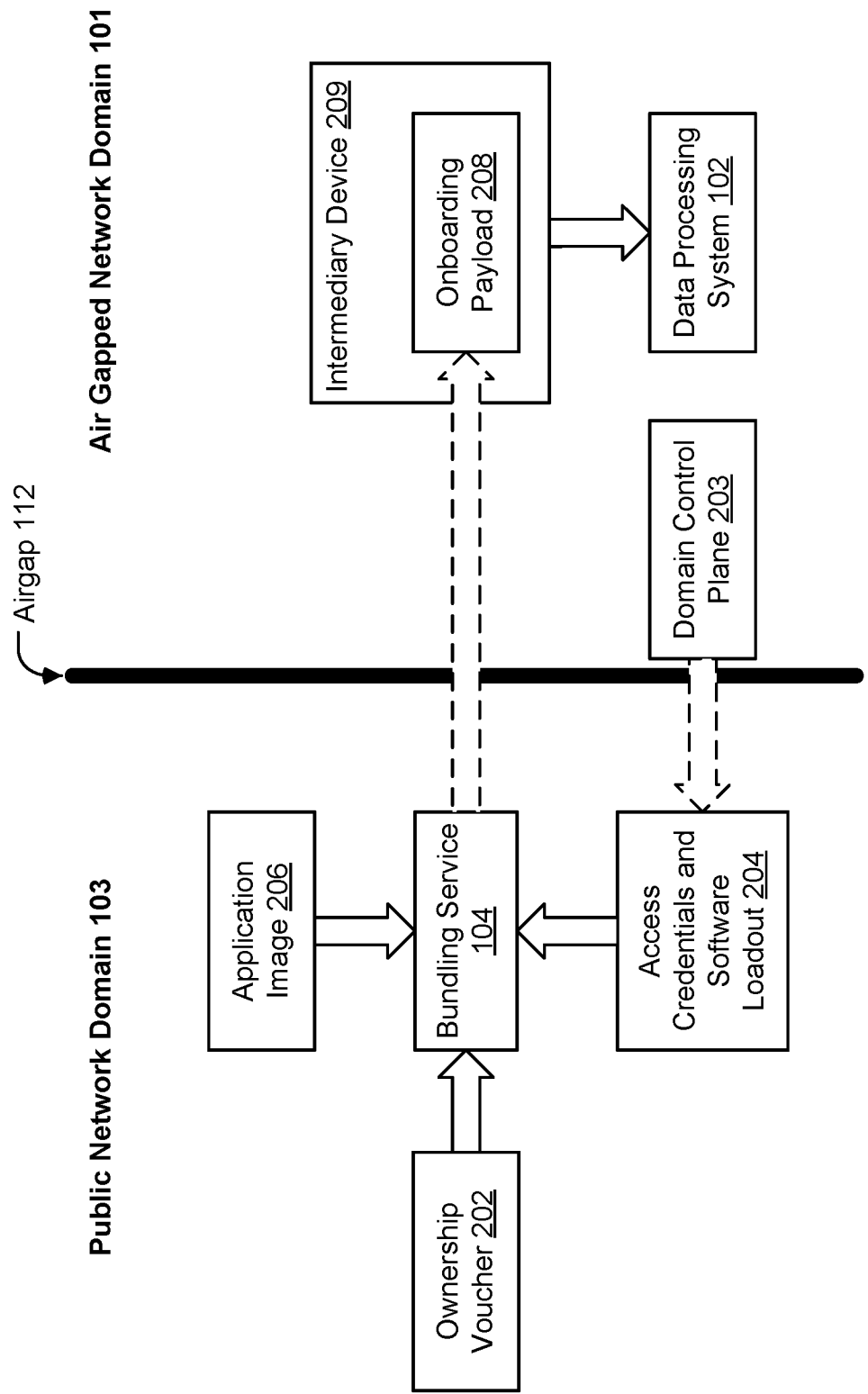
FIG. 2A shows a data flow diagram illustrating data flows and/or operations in a system over time in accordance with an embodiment.

To further clarify generation and use of onboarding payloads, a data flow diagram illustrating data flows in a system in accordance with an embodiment is shown in FIG. 2A.

As discussed above, bundling service 104 may receive a request from a requestor (e.g., an individual attempting to complete onboarding of the data processing system 102 mentioned above) to obtain onboarding payload 208 for data processing system 102 while data processing system 102 is unable to independently obtain the onboarding data due to airgap 112 preventing data processing system 102 from accessing data sources located in public network domain 103. To service the request, bundling service 104 may collect access credentials and software loadout 204, ownership voucher 202, and at least one application image 206. Each of these are discussed below.

To initiate the request and/or based on the request, the requestor may obtain access credentials (e.g., a verification information for data processing system 102) from domain control plane 203. The access credentials may allow data processing system 102 to join the domain to which the requestor desires data processing system to join.

The software loadout (e.g., a list of software components to be hosted by data processing system 102 once onboarded) may be obtained from the domain control plane 203. Because domain control plane 203 may be located in air gapped network domain 101, access credentials and software loadout 204 may be transferred, for example, via an intermediary devices as illustrated using an oversized arrow without dashed outlining.

Application image 206 may include information usable to instantiate an executing entity (e.g., an application) on data processing system 102. While illustrated in FIG. 2A with respect to a single application image, it will be appreciated that any number of application images usable to instantiate executing entities corresponding to the software loadout for data processing system 102 may be obtained.

Ownership voucher 202 may delegates some authority over the data processing system 102 to the requestor (e.g., which may have purchased it from the manufacturer or another party, which may have authority over t). Ownership voucher 202 may delegate authority using any number of certificates. These certificates may be signed by entities have certain levels of authority. The certificates may delegate authority to others (e.g., a purchaser of data processing system 102) and/or modify certain policies implemented by data processing system 102. For example, ownership voucher may include one or more certificates that modify existing security policies (e.g., unlock a locked boot menu) of data processing system 102 or otherwise define the security policies to be enforced by data processing system 102 once onboarded. The requestor may provide information regarding these security policies to the manufacturer (or other source of the ownership voucher) thereby allowing an existing party with authority to modify the security policies of data processing system 102 to modify them to comply with the requestor's expectations.

In addition to certificates for establishing a set of security policies post onboarding, the certificates may also provide for secure component validation to validate the integrity of the hardware (e.g., verify that data processing system 102 has not been tampered with), ownership credentialing about data processing system's 102 owner, and/or a source of authority in the domain to which data processing system 102 will be onboarded (e.g., domain control plane 203) to which data processing system 102 will operate with in the future.

As will be discussed with respect to FIG. 2C, the root of trust implemented by data processing system 102 may be defined by the certificates through which authority may be delegated, policies may be established, etc. By doing so, embodiments disclosed herein may provide a data processing system 102 that manages authority through cryptographically secure certificates (or other types of secure data structures), with the manufacture serving as the initial, highest level of authority within an authority hierarchy.

After the data as shown in FIG. 2A is obtained by bundling service 104, bundling service 104 may condense and cryptographically secure the data into onboarding payload 208. Bundling service 104 may store the onboarding payload 208 onto intermediary device 209.

Shown the oversized arrow with dashed outline, intermediary device 209 may be used (e.g., by the requestor) to transfer onboarding payload 208 from public network domain 103 to data processing system 102. To do so, intermediary device 209 may be operably connected to the bundling service thereby allowing bundling payload 208 to be stored on it. Intermediary device 209 may be disconnected and physically transported to data processing system 102 (or at least into air gapped network domain 101). Intermediary device 209 may operably connected to data processing system 102 to provide access to bundling payload 208. Once operably connected, data processing system 102 may take action to process and implement bundling payload 102 (e.g., validate certificates, implement changes based on the validated certificates, deploy software instances, etc.).

In this manner, embodiments disclosed herein may facilitate onboarding of data processing systems in a broad range of environments that may not allow for the data processing systems to independently collect onboarding information.

Figure 2B:
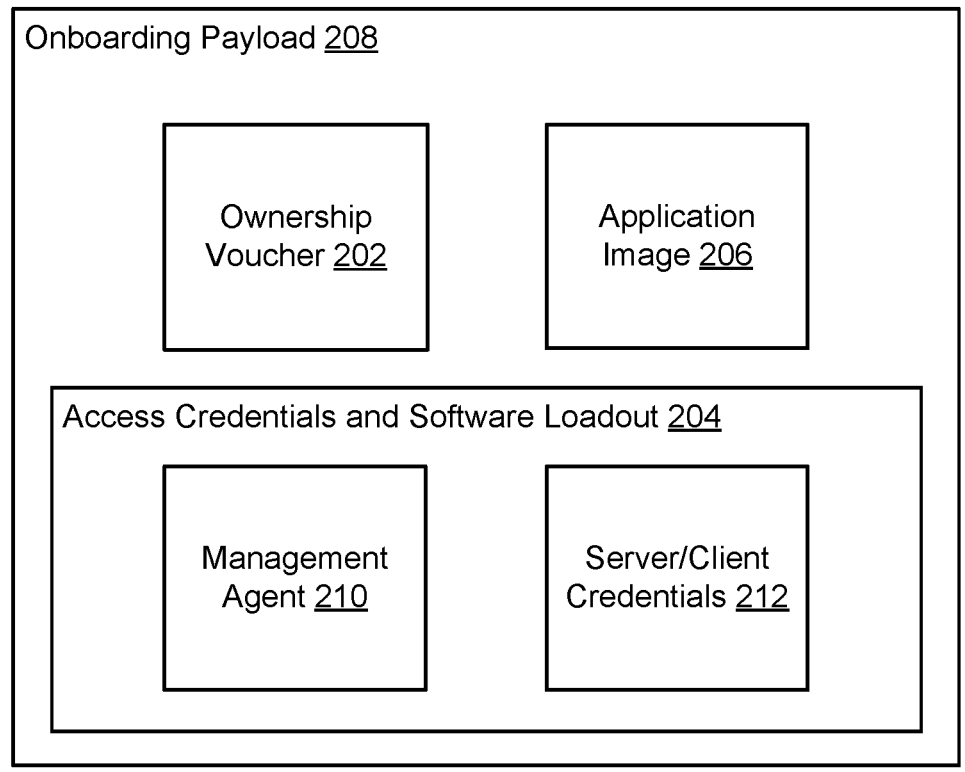
FIG. 2B shows a block diagram illustrating an onboarding payload in accordance with an embodiment.
Figure 2C:
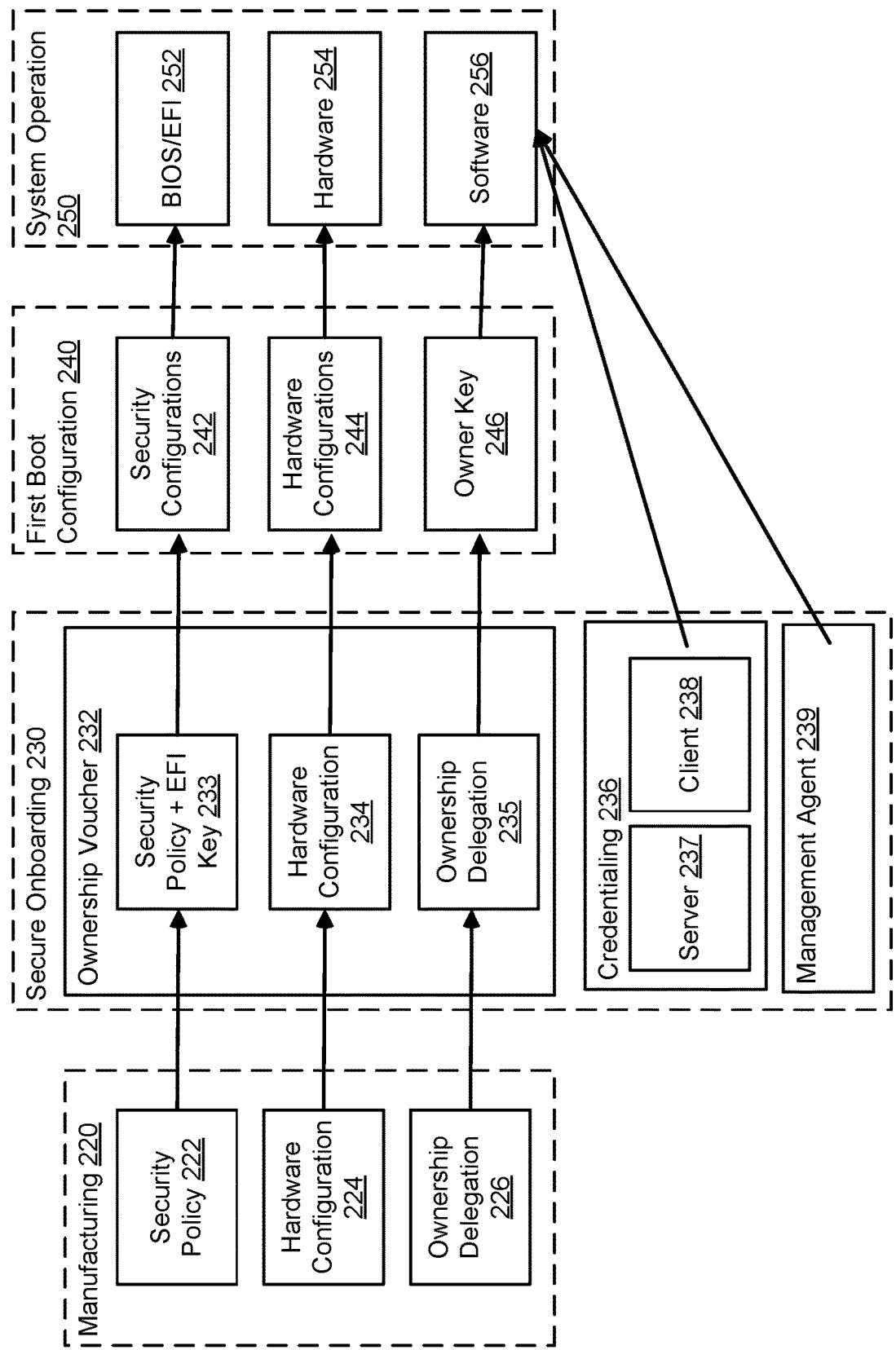
FIG. 2C shows a block diagram illustrating data structures used during onboarding of a data processing system in accordance with an embodiment.

Turning to FIGS. 2B-2C, diagrams of data structures usable by components of the system of FIG. 1-2A are shown. Any of these data structures may be implemented using, for example, lists, tables, databases, linked lists, and/or other type of data structures. Any of the data structures may be shared, spanned across multiple devices, and may be maintained and used by any number of entities. Additionally, while illustrated as including a limited amount of specific data, any of these data structures may include additional, less, and/or different data without departing from embodiments disclosed herein.

Turning to FIG. 2B, a diagram of onboarding payload 208 in accordance with an embodiment is shown. As noted above, onboarding payload 208 may be a cryptographically secure, single, self-sufficient file usable to onboard a data processing system.

Onboarding payload 208 may include ownership voucher 202 (further described with respect to FIG. 2C), application image 206, and access credentials and software loadout 204. Each of these portions of onboarding payload 208 is discussed below.

Access credentials and software loadout 204 may include management agent 210 which may specify the locations of the software images to be deployed to a data processing system. Bundling service 104 may obtain management agent 210 by modifying a management agent that points to where software images may be located in a public network to instead point at locations within onboarding payload where the software images are located.

Access credentials and software loadout 204 may further include server/client credentials 212. Server/client credentials 212 may permit data processing system 102 to access air gapped network domain 101.

Turning to FIG. 2C, a diagram illustrating data structures and interactions between system components and the data structures in accordance with an embodiment is shown. For example, the diagram shown in FIG. 2C may illustrate a process through which the components of an onboarding payload may be used to complete an onboarding.

Now, consider a scenario as shown in FIG. 2C in which a manufacture constructs data processing system 102 through a process of manufacturing 220. As part of manufacturing 220, various certificates (222-226) may be stored on data processing system 102 and that define security policies, hardware configurations, and ownership of data processing system. Generally, these policies may be restrictive to reduce the likelihood of undesired use and/or interactions with data processing system 102. For example, the resulting security policies may limit the ability of data processing system 102 to be booted, may define which pieces of software may be executed by data processing system 102 (e.g., extensible firmware interface (EFI) keys), etc. The certificates may also define who has authority to make changes to these restrictions.

After manufacturing 220, data processing system 102 may be purchased and a new owner may wish to conform the operation of data processing system 102 to meet certain criteria. To do so, the new owner may wish to perform an onboarding of data processing system.

To onboard data processing system 102, secure onboarding 230 may be performed. As part of secure onboarding 230, various data structures including ownership voucher 232, credentialing 236, and management agent 239 may be used. As discussed above, in an embodiment, an onboarding payload may be generated that includes each of these data structures. Consequently the onboarding payload may be used to onboard data processing system 102 when the data structures otherwise may not be accessed independently by data processing system 102.

Ownership voucher 232 may include various certificates (e.g., 233-235) that may delegate authority over data processing system 102 to another party and/or may modify the security policies and/or hardware configurations defined by the certificates (e.g., 222-226) deployed by the manufacturer. The authority delegated by the manufacturer may not remove the manufacturer as the root of trust. Rather, the manufacturer may retain its authority over data processing system 102 including, for example, the ability to revoke the delegated authority. The ownership voucher may be obtained, for example, from a management service (e.g., management service 106 from FIG. 1) of the data processing system's manufacturer.

The ownership voucher 232 may delegate authority by including signed certificates verifiable by data processing system 102. The certificates may include, for example, (i) security policy+EFI key 233 that may modify (e.g., updates, changes, etc.) previously implemented security policies (e.g., security policy 222), (ii) hardware configuration 234 that may include secure component validation (SCV) information to validate the integrity of the hardware of data processing system 102 (e.g., verify that the data processing system has not been tampered with since the generation of hardware configuration 224 during manufacturing of the computing device), and (iii) ownership delegation 235 which may include information about the data processing system's owner.

The onboarding payload may also include credentialing 236 to permit data processing system 102 to join a domain and/or access to a control-plane through which data processing system 102 may be further managed. Credentialing 236 may include both server 237 credentials and/or client 238 credentials. Server 237 credentials and/or client 238 credentials may be credentials obtained from the control-plane that will be used by an owner to manage it.

The onboarding payload may also include management agent 239. The management agent 239 may identify a location (e.g., a URL) from which a software loadout (required for onboarding) is to be obtained.

Secure onboarding 230 may place data processing system 102 in condition to operate in a manner as expected by an owner.

After secure onboarding 230, data processing system 102 may begin to operate. For example, data processing system 102 may perform first boot configuration 240. During first boot configuration 240, data processing system 102 may resolve (e.g., validate, and apply various changes specified by the certificates) the certificates stored on it to identify how it will operate. For example, data processing system may establish security configurations 242 (e.g., that may limit booting, software that may execute, etc.), hardware configurations 244 (e.g., settings for hardware devices), and an owner's key 246 (e.g., usable to ascertain whether to follow signed instructions from a control plane). These data structures may guide the operation of data processing system 102 post onboarding.

Once first boot configuration 240 is complete, data processing system 102 may enter system operation 250 phase. During system operation 250, the configurations and/or other changes (e.g., identification of public keys to which authority has been delegated) made during first boot configuration 240 may be used to manage (i) operation of a basic input output system (BIOS) and extensive firmware interface (EFI) keys 252, (ii) operation/verification of hardware (254), and/or (iii) installation of software 256 (e.g., specified by the software loadout/management agent and/or local control plane via instructions signed by the local control plane an verified with the designed public key). By doing so, the operation of data processing system 102 may be conformed to the expectations of the new owner using a verifiable set of certificates with authority delegated from the root of trust (e.g., the manufacturer).

As discussed above, various components of the system of FIG. 1 may perform various methods to complete onboarding of a data processing system. FIGS. 3-4 show methods that may be performed when onboarding data processing systems. While FIGS. 3-4 are illustrated with operations in a specific order, the operations may be performed in different orders, any of the operations may be omitted, additional operations (not shown) may be performed, and/or any of the operations may be performed in a parallel or partially overlapping in time manner with respect to other operations.

Turning to FIG. 3, a flow diagram illustrating methods for obtaining an onboarding payload in accordance with an embodiment is shown. The method illustrated in FIG. 3 may be performed, for example, by bundling service 104 and/or other components of the system of FIG. 1.

At operation 302, obtain a request from a requestor for an onboarding payload for a data processing system. Data processing system may be on an air gapped domain which may prevent the data processing system from obtaining onboarding data necessary to complete an onboarding. The request may be obtained by receiving it from the requestor via a message or other communication.

At operation 304, an ownership voucher for the data processing system is obtained. The ownership voucher may be obtained by requesting it from a management service (e.g., a manufacturer or other entity that has authority over the data processing system as specified by the certificates used by the data processing system). The management service may generate the ownership voucher and provide it in response to the request.

At operation 306, access credentials and a software loadout for the data processing system are obtained. The access credentials and software loadout may be obtained by requesting them from a control plane of the domain in which the data processing system will be deployed.

In an embodiment, the access credentials and software loadout are obtained by receiving them in the domain, and storing them on an intermediary device. The intermediary device may then be used to provide the access credentials and the software loadout to a bundling service.

For example, a bundling service may be hosted on a public domain (e.g., The Internet), while a laptop for a new employee may need to be deployed onto a private domain (e.g., air gapped domain). To obtain an onboarding payload for the laptop to proceed with onboarding of the laptop, access credentials and a software loadout from the private domain's control-plane may be obtained, stored on a flash drive, and moved to connect the flash drive to the public domain. While the flash drive is connected to the public domain, the bundling service may obtain the access credentials and software loadout stored on the flash drive.

At operation 308, an application image based on the access credentials and the software loadout is obtained. The application image may be obtained by request it from a data source in which application images are stored. The application image may be provided in response to the request. Any number of application images may be obtained, depending on the software loadout.

A location (e.g., a URL) from which the application image is to be obtained may be obtained from the software loadout. The location may be read by the bundling service and the bundling service obtain the application image from the location.

At operation 310, an onboarding payload is obtained using the ownership voucher, the access credentials, the software loadout, and the application image (and/or other application images). The onboarding payload may be obtained by adding the ownership voucher, the access credentials, the software loadout, and the application image to a single file. Any number of these data structures (e.g., multiple applications images for a variety of applications) may be added to or otherwise combined (entirely or in part) to obtain the onboarding payload. Any of these data structures may be modified as part of the process of obtaining the onboarding payload.

In an embodiment, the software loadout, obtained from the local control plane, is modified and added to the onboarding payload. For example, the software loadout may be modified to indicate that the application images are located on an intermediary device (as opposed to the locations indicated by the software loadout as obtained from the local control plane). By doing so, automation software usable to perform onboarding may not need to be modified to use the onboarding payload to onboard a data processing system.

The single file may also be cryptographically secured (e.g., through use of cryptographic signatures, certifications, or the like) by the bundling service. By doing so, the bundling service may obtain a self-sufficient file to be the onboarding payload to be used for onboarding of the data processing system.

At operation 312, the onboarding payload is stored on an intermediary device (e.g., intermediary device 209). The onboarding payload may be stored in the intermediary devices by operably connecting (e.g., directly such as exposing the intermediary device as a mass storage device, or indirectly such as through a network to which a host data processing system is operably connected to the entity that generated or stores a copy of the onboarding payload) the intermediary device to an entity that generated or stores a copy of the onboarding payload. When operably connected, the onboarding payload (or a copy) may be sent to and stored in the intermediary device. The intermediary device may then be used, for example, by the requestor to complete onboarding of the data processing system.

The method may end following operation 312.

Using the method illustrated in FIG. 3, a system in accordance with an embodiment may be able to manage onboarding of a data processing system within an isolated network domain.

Turning to FIG. 4, a flow diagram illustrating a method for onboarding a data processing system in an isolated network domain in accordance with an embodiment is shown. The method illustrated in FIG. 4 may be performed, for example, by a data processing system or other components of the system of FIG. 1.

At operation 402, a start-up of a data processing system is performed. The startup may be performed by powering the data processing system, restarting the data processing system, and/or via other processes. The startup of the data processing system may include (i) powering on the data processing system, (ii) completing a Power on Self-Test (POST), and/or (iii) beginning an onboarding for the data processing system (which may be performed by automation software or other types of entities hosted by the data processing system and/or manually initiated by an operator/administrator/other person tasked with onboarding the data processing system).

At operation 404, presence of an onboarding payload on an intermediary device operably connected to the data processing system is identified. The presence of the onboarding payload may be identified by reading (and/or analyzing) data stored on the intermediary device to recognize the presence of the onboarding payload in storage of the intermediary deice, via a notification received from the data processing system that indicates the presence of the onboarding payload in the storage of the intermediary device, and/or via other processes.

At operation 406, based on the identification of the onboarding payload, an onboarding of the data processing system is performed using the onboarding payload. The onboarding may be performed by (i) reading certificates, credentials, keys and/or other cryptographic data, and/or other data structures included in the onboarding payload, (ii) validating the data included in the payload (e.g., such as verifying that the certificates are properly signed, verifying that the intermediary device is a trusted device, verifying that the onboarding payload itself can be cryptographically validated as being from and/or endorsed by a trusted source, and/or (iii) using the read and verified information to update operation of the data processing system.

For example, certificates that define security policies and can be validated may be used to modify existing security policies. The modified policies may define, for example, acceptable startup processes and prohibited startup processes. Other certificates/data structures included in the onboarding payload may be used to, for example, define hardware configurations, set hardware presence expectations, define ownership/authority over the data processing system, provide credentials for connecting to a local domain, facilitate verification of instructions received from the control plane of the local domain, deploy various applications to the data processing system, and/or provide other onboarding/data processing system management functionalities.

The method may end following operation 406.

Using the method illustrated in FIG. 4, a system in accordance with an embodiment may facilitate onboarding payload (e.g., the onboarding payload obtained by the bundling service discussed with respect to FIG. 3) within an isolated network domain.

Any of the components illustrated in FIGS. 1-4 may be implemented with one or more computing devices. Turning to FIG. 5, a block diagram illustrating an example of a data processing system (e.g., a computing device) in accordance with an embodiment is shown. For example, system 510 may represent any of data processing systems described above performing any of the processes or methods described above. System 510 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 510 is intended to show a high level view of many components of the computer system. However, it is to be understood that additional components may be present in certain implementations and furthermore, different arrangement of the components shown may occur in other implementations. System 510 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 510 includes processor 511, memory 513, and devices 515-517 via a bus or an interconnect 520. Processor 511 may represent a single processor or multiple processors with a single processor core or multiple processor cores included therein. Processor 511 may represent one or more general-purpose processors such as a microprocessor, a central processing unit (CPU), or the like. More particularly, processor 511 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 511 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 511, which may be a low power multi-core processor socket such as an ultra-low voltage processor, may act as a main processing unit and central hub for communication with the various components of the system. Such processor can be implemented as a system on chip (SoC). Processor 511 is configured to execute instructions for performing the operations discussed herein. System 510 may further include a graphics interface that communicates with optional graphics subsystem 514, which may include a display controller, a graphics processor, and/or a display device.

Processor 511 may communicate with memory 513, which in one embodiment can be implemented via multiple memory devices to provide for a given amount of system memory. Memory 513 may include one or more volatile storage (or memory) devices such as random access memory (RAM), dynamic RAM (DRAM), synchronous DRAM (SDRAM), static RAM (SRAM), or other types of storage devices. Memory 513 may store information including sequences of instructions that are executed by processor 511, or any other device. For example, executable code and/or data of a variety of operating systems, device drivers, firmware (e.g., input output basic system or BIOS), and/or applications can be loaded in memory 513 and executed by processor 511. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 510 may further include IO devices such as devices (e.g., 515, 515, 517, 518) including network interface device(s) 515, optional input device(s) 515, and other optional IO device(s) 517. Network interface device(s) 515 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 515 may include a mouse, a touch pad, a touch sensitive screen (which may be integrated with a display device of optional graphics subsystem 514), a pointer device such as a stylus, and/or a keyboard (e.g., physical keyboard or a virtual keyboard displayed as part of a touch sensitive screen). For example, input device(s) 515 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity data collector arrays or other elements for determining one or more points of contact with the touch screen.

IO devices 517 may include an audio device. An audio device may include a speaker and/or a microphone to facilitate voice-enabled functions, such as voice recognition, voice replication, digital recording, and/or telephony functions. Other IO devices 517 may further include universal serial bus (USB) port(s), parallel port(s), serial port(s), a printer, a network interface, a bus bridge (e.g., a PCI-PCI bridge), data collector(s) (e.g., a motion data collector such as an accelerometer, gyroscope, a magnetometer, a light data collector, compass, a proximity data collector, etc.), or a combination thereof. IO device(s) 517 may further include an imaging processing subsystem (e.g., a camera), which may include an optical data collector, such as a charged coupled device (CCD) or a complementary metal-oxide semiconductor (CMOS) optical data collector, utilized to facilitate camera functions, such as recording photographs and video clips. Certain data collectors may be coupled to interconnect 520 via a data collector hub (not shown), while other devices such as a keyboard or thermal data collector may be controlled by an embedded controller (not shown), dependent upon the specific configuration or design of system 510.

To provide for persistent storage of information such as data, applications, one or more operating systems and so forth, a mass storage (not shown) may also couple to processor 511. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also, a flash device may be coupled to processor 511, e.g., via a serial peripheral interface (SPI). This flash device may provide for non-volatile storage of system software, including a basic input/output software (BIOS) as well as other firmware of the system.

Storage device 518 may include computer-readable storage medium 519 (also known as a machine-readable storage medium or a computer-readable medium) on which is stored one or more sets of instructions or software (e.g., processing module, unit, and/or processing module/unit/logic 538) embodying any one or more of the methodologies or functions described herein. Processing module/unit/logic 538 may represent any of the components described above. Processing module/unit/logic 538 may also reside, completely or at least partially, within memory 513 and/or within processor 511 during execution thereof by system 510, memory 513 and processor 511 also constituting machine-accessible storage media. Processing module/unit/logic 538 may further be transmitted or received over a network via network interface device(s) 515.

Computer-readable storage medium 519 may also be used to store some software functionalities described above persistently. While computer-readable storage medium 519 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 538, components and other features described herein can be implemented as discrete hardware components or integrated in the functionality of hardware components such as ASICS, FPGAs, DSPs or similar devices. In addition, processing module/unit/logic 538 can be implemented as firmware or functional circuitry within hardware devices. Further, processing module/unit/logic 538 can be implemented in any combination hardware devices and software components.

Note that while system 510 is illustrated with various components of a data processing system, it is not intended to represent any particular architecture or manner of interconnecting the components as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing a data processing system, the method comprising:
   receiving, by a bundling service, a request from a requestor to obtain an onboarding payload for the data processing system while the data processing system is unable to independently obtain the onboarding payload;
   based on the request:
      obtaining, by the bundling service, an ownership voucher that delegates authority over the data processing system to the requestor;
      obtaining, by the bundling service, access credentials for a first domain to which the data processing system will be deployed and a software loadout for the data processing system;
      obtaining, by the bundling service, an application image based on the software loadout;
      obtaining, by the bundling service, the onboarding payload using the ownership voucher, the access credentials, the software loadout, and the application image; and
      uploading, by the bundling service, a copy of the onboarding payload onto an intermediary device to complete an onboarding of the data processing system, wherein the onboarding of the data processing system is completed by, at least:
         modifying a management agent to identify a copy of the application image stored in the onboarding payload rather than a location from which the application image was obtained prior to obtaining the onboarding payload,
         wherein the data processing system is connected to the intermediary device to initiate the onboarding of the data processing system to the first domain and the onboarding of the data processing system is completed using the onboarding payload on the intermediary device.

2. The method of claim 1, wherein the onboarding payload is a cryptographically secure, self-sufficient single file comprising:
   data required to onboard the data processing system to the first domain.

3. The method of claim 2, wherein the bundling service is operably connected to a second domain, and the bundling service is unable to operably connected to devices operably connected to the first domain.

4. The method of claim 3, wherein delegating authority over the data processing system comprises:
   providing, by the ownership voucher, cryptographically secure information that identifies an owner of the data processing system;
   providing, by the ownership voucher, cryptographically secure component validation data for the data processing system; and
   providing, by the ownership voucher, a cryptographically secure set of configurations that modify existing configurations of the data processing system.

5. The method of claim 3, wherein obtaining the access credentials and software loadout comprises:
   obtaining, by the bundling service, a management agent that identifies the application image, wherein the application image comprises software applications required for onboarding the data processing system onto the first domain; and
   obtaining, by the bundling service, client credentials and server credentials for the data processing system to gain permissions within the first domain.

6. The method of claim 3, wherein the intermediary device is operably connected to the first domain and is not operably connected to the second domain.

7. The method of claim 6, wherein the intermediary device is operably connected to the second domain and is not operably connected to the first domain.

8. The method of claim 1, wherein prior to completing the onboarding of the data processing system, the method further comprises:
   identifying, by the data processing system, presence of the onboarding payload on the intermediary device, the onboarding being completed after the identification of the presence of the onboarding payload.

9. The method of claim 1, wherein portions of the onboarding payload are signed using a cryptographic key of an entity that delegates the authority over the data processing system to the requestor to establish a root of trust for the data processing system that is independent of all control planes used to manage the data processing system.

10. A non-transitory machine-readable medium having instructions stored therein, which when executed by a processor, cause the processor to perform operations for managing a data processing system, the operations comprising:
   receiving, by a bundling service, a request from a requestor to obtain an onboarding payload for the data processing system while the data processing system is unable to independently obtain the onboarding payload;
   based on the request:
      obtaining, by the bundling service, an ownership voucher that delegates authority over the data processing system to the requestor;
      obtaining, by the bundling service, access credentials for a first domain to which the data processing system will be deployed and a software loadout for the data processing system;
      obtaining, by the bundling service, an application image based on the software loadout;
      obtaining, by the bundling service, the onboarding payload using the ownership voucher, the access credentials, the software loadout, and the application image; and
      uploading, by the bundling service, a copy of the onboarding payload onto an intermediary device to complete an onboarding of the data processing system, wherein the onboarding of the data processing system is completed by, at least:
         modifying a management agent to identify a copy of the application image stored in the onboarding payload rather than a location from which the application image was obtained prior to obtaining the onboarding payload,
         wherein the data processing system is connected to the intermediary device to initiate the onboarding of the data processing system to the first domain and the onboarding of the data processing system is completed using the onboarding payload on the intermediary device.

11. The non-transitory machine-readable medium of claim 10, wherein the onboarding payload is a cryptographically secure, self-sufficient single file comprising:
   data required to onboard the data processing system to the first domain.

12. The non-transitory machine-readable medium of claim 11, wherein the bundling services is operably connected to a second domain, and the bundling service is unable to operably connected to devices operably connected to the first domain.

13. The non-transitory machine-readable medium of claim 10, wherein delegating authority over the data processing system comprises:
   providing, by the ownership voucher, cryptographically secure information that identifies an owner of the data processing system;
   providing, by the ownership voucher, cryptographically secure component validation data for the data processing system; and
   providing, by the ownership voucher, a cryptographically secure set of configurations that modify existing configurations of the data processing system.

14. The non-transitory machine-readable medium of claim 13, wherein obtaining the access credentials and software loadout comprises:
   obtaining, by the bundling service, a management agent that identifies the application image, wherein the application image comprises software applications required for onboarding the data processing system onto the first domain; and
   obtaining, by the bundling service, client credentials and server credentials for the data processing system to gain permissions within the first domain.

15. A first data processing system, comprising:
   a processor; and
   a memory coupled to the processor to store instructions, which when executed by the processor, cause the processor to perform operations for managing a second data processing system, the operations comprising:
   receiving, by a bundling service, a request from a requestor to obtain an onboarding payload for the second data processing system while the second data processing system is unable to independently obtain the onboarding payload;
   based on the request:
   obtaining, by the bundling service, an ownership voucher that delegates authority over the second data processing system to the requestor;
   obtaining, by the bundling service, access credentials for a first domain to which the second data processing system will be deployed and a software loadout for the second data processing system;
   obtaining, by the bundling service, an application image based on the software loadout;
   obtaining, by the bundling service, the onboarding payload using the ownership voucher, the access credentials, the software loadout, and the application image; and
   uploading, by the bundling service, a copy of the onboarding payload onto an intermediary device to complete an onboarding of the second data processing system, wherein the onboarding of the second data processing system is completed by, at least:
      modifying a management agent to identify a copy of the application image stored in the onboarding payload rather than a location from which the application image was obtained prior to obtaining the onboarding payload,
      wherein the second data processing system is connected to the intermediary device to initiate the onboarding of the second data processing system to the first domain and the onboarding of the second data processing system is completed using the onboarding payload on the intermediary device.

16. The first data processing system of claim 15, wherein the onboarding payload is a cryptographically secure, self-sufficient single file comprising: data required to install, configure, and bring the second data processing system online in the first domain.

17. The first data processing system of claim 16, wherein the bundling service is operably connected to a second domain, and the bundling service is unable to operably connected to devices operably connected to the first domain.

18. The first data processing system of claim 15, wherein delegating authority over the second data processing system comprises: providing, by the ownership voucher, cryptographically secure information that identifies an owner of the second data processing system; providing, by the ownership voucher, cryptographically secure component validation data for the second data processing system; and providing, by the ownership voucher, a cryptographically secure set of configurations that modify existing configurations of the second data processing system.

19. The first data processing system of claim 18, wherein obtaining the access credentials and software loadout comprises: obtaining, by the bundling service, a management agent that identifies the application image, wherein the application image comprises software applications required for onboarding the second data processing system onto the first domain; and obtaining, by the bundling service, client credentials and server credentials for the second data processing system to gain permissions within the first domain.

20. The first data processing system of claim 15, wherein prior to completing the onboarding of the second data processing system, the operation further comprises:
    identifying, by the second data processing system, presence of the onboarding payload on the intermediary device, the onboarding being completed after the identification of the presence of the onboarding payload.

\* \* \* \* \*